United States Patent
Nakayama et al.

(10) Patent No.: US 7,113,975 B2
(45) Date of Patent: Sep. 26, 2006

(54) SERVER DEVICE FOR NET GAMES, METHOD FOR CONTROLLING PROGRESS OF NET GAME AND PROGRAM FOR EXECUTING NET GAME

(75) Inventors: Norio Nakayama, Osaka (JP); Katsuhiro Goto, Neyagawa (JP); Hiromoto Yotsugi, Osaka (JP); Kazuhiro Namba, Amagasaki (JP); Masatoshi Yamaoka, Sakai (JP); Satoko Naito, Sakai (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 563 days.

(21) Appl. No.: 10/047,794

(22) Filed: Jan. 14, 2002

(65) Prior Publication Data

US 2002/0096831 A1 Jul. 25, 2002

(30) Foreign Application Priority Data

Jan. 19, 2001 (JP) ................................ 2001-012360

(51) Int. Cl.
 G06F 15/16 (2006.01)

(52) U.S. Cl. ..................... 709/204; 709/201; 709/225; 709/226

(58) Field of Classification Search ................ 709/201, 709/204, 225, 226
See application file for complete search history.

(56) References Cited

U.S. PATENT DOCUMENTS

| 6,042,476 A | 3/2000 | Ohashi et al. |
| 6,352,479 B1 * | 3/2002 | Sparks, II ..................... 463/42 |
| 6,524,189 B1 * | 2/2003 | Rautila ......................... 463/40 |
| 6,549,768 B1 * | 4/2003 | Fraccaroli ................ 455/456.3 |
| 6,690,918 B1 * | 2/2004 | Evans et al. ................ 455/41.2 |
| 6,699,125 B1 * | 3/2004 | Kirmse et al. ................ 463/42 |
| 6,742,037 B1 * | 5/2004 | Hall et al. ................... 709/228 |
| 6,772,195 B1 * | 8/2004 | Hatlelid et al. ............. 709/204 |
| 6,807,562 B1 * | 10/2004 | Pennock et al. ............ 709/204 |

FOREIGN PATENT DOCUMENTS

| CN | 1190214 A | 8/1998 |
| JP | 8-006795 | 1/1996 |
| JP | 2000-233078 | 8/2000 |
| JP | 2001-309440 | 11/2001 |
| KR | 2001-0000645 | 1/2001 |

* cited by examiner

Primary Examiner—Saleh Najjar
(74) Attorney, Agent, or Firm—Jordan and Hamburg LLP

(57) ABSTRACT

A server device for net game is provided with a party organizing section 101 for organizing a plurality of members participating in a virtual party, a question preparing section 102 for preparing a specified number of questions to be presented to organized mobile communication terminals, a matching section 104 for selecting two members from those participating in the party based on answers to the prepared questions and a congeniality evaluation parameter value, a question drafting section 105 for letting the selected two members to draft a specified number of questions and possible answers corresponding to the questions, an access setting section 106 for enabling an access time and an imaginary access place to be set based on answers to the drafted questions and the congeniality evaluation parameter value, and an access judging section 107 for judging whether the two selected members have accessed at the set time and imaginary place and giving mailboxes.

13 Claims, 14 Drawing Sheets

SERVER DEVICE FOR NET GAMES, METHOD FOR CONTROLLING PROGRESS OF NET GAME AND PROGRAM FOR EXECUTING NET GAME

The present invention relates to a net game technology applicable on networks and enabling data communication with mobile communication terminals via the networks.

BACKGROUND OF THE INVENTION AND RELATED ART STATEMENT

There have been web sites on Internet which can furnish simple games, and these games can be enjoyed by accessing to these game sites via mobile phones.

Further, electronic mails are widely spread as one of communication means in personal computers, mobile phones, etc.

Also known are training games in which players are trained to correctly answer questions. However, there is no such game in which the progress of the game changes and evolves in relation to other players.

Although the conventional net games possess a bilateral nature such as exchange of electronic mails between players, this bilateral nature mainly concerns an exchange of information in the progress of the game and it has been difficult to understand other players' tastes, hobbies, characters, etc.

In view of the above problem residing in the prior art, an object of the present invention is to provide a server device for an interesting and enjoyable net game enabling players to find out compatible friends therethrough, a method for controlling the progress of the net game, and a program for executing the net game.

SUMMARY OF THE INVENTION

In order to achieve the object, according to the invention, a server device for a net game applicable on a network and enabling data communication with mobile communication terminals registered as members, comprising: organizing means for organizing groups consisting of a specified number of members upon a member registration request from the respective mobile communication terminals, question storage means for storing contents of a plurality of questions, question preparing means for selecting and preparing a specified number of questions from the contents stored in the question storage means, transmitting/receiving means for transmitting the prepared questions to the respective mobile communication terminals in the group and receiving an answer information from the respective mobile communication terminals corresponding to the questions presented on monitors of the respective mobile communication terminals, first answer information storage means for storing the answer information in correspondence with the respective mobile communication terminals, and congeniality judging means for judging the congeniality of each possible pair of the respective mobile communication terminals in the group based on the respective pieces of answer information stored in the first answer information storage means and pairing the mobile communication terminals having the answer information showing congeniality.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
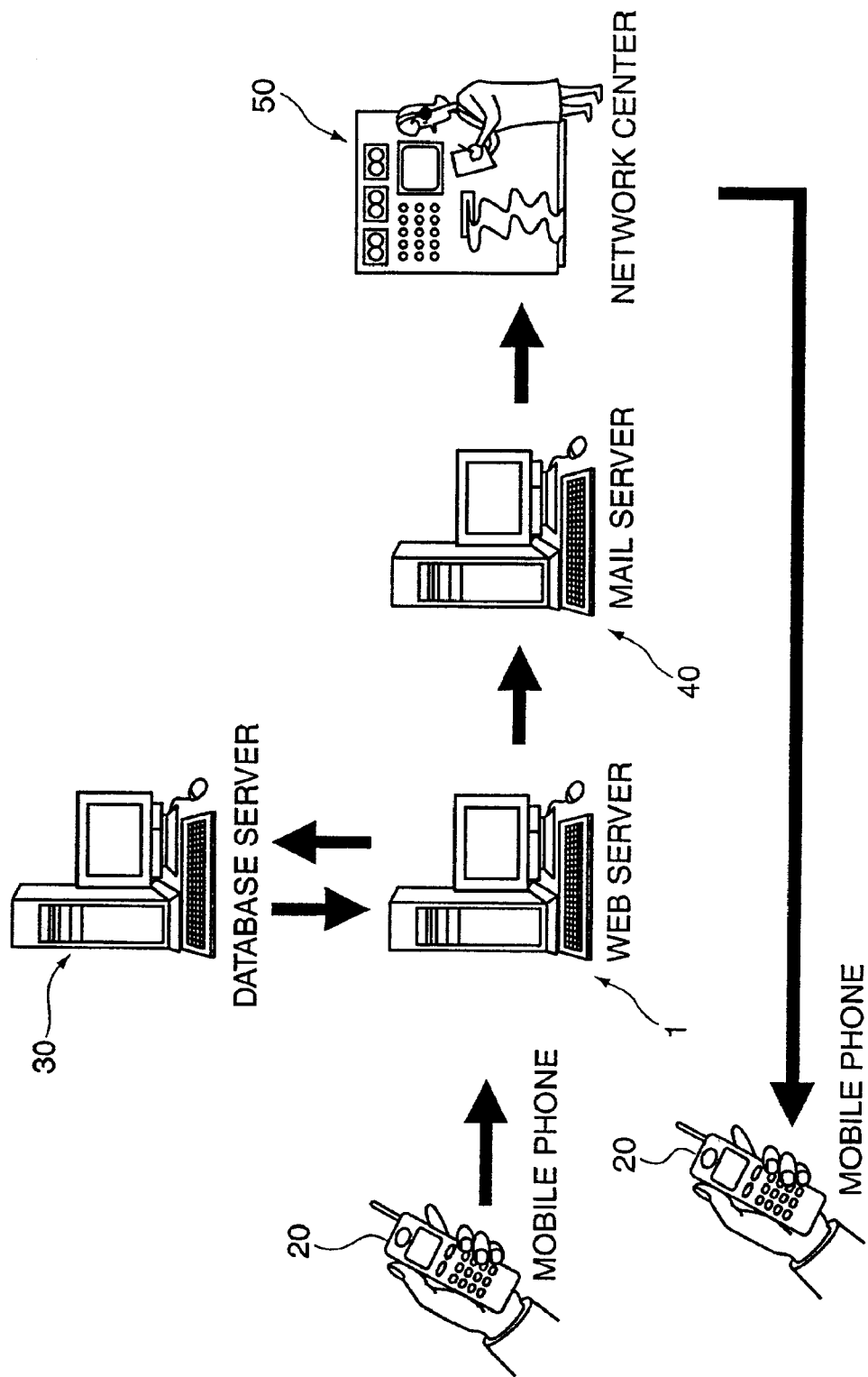
FIG. 1 is a diagram showing the entire construction of a net game system to which the invention is applied.

FIG. 1 is a diagram showing the entire construction of a net game system to which the invention is applied: The net game system is comprised of a web (WWW) server 1 operable on Internet which is a network, mobile phones 20 which are an example of a mobile communication device as a mobile communication terminal, a database server 30 for storing a member information and other data, a mail server 40 for delivering a specified data to the mobile phones 20, and a network center 50 of a mobile phone company (provider) for transmitting a mail to the mobile phone 20 upon receiving an instruction from the mail server 40. Although the web server 1, the database server 30 and the mail server 40 have each a built-in processing computer in this embodiment, two of them or all of three may be formed into one unit to be processed by the same computer.

Figure 2:
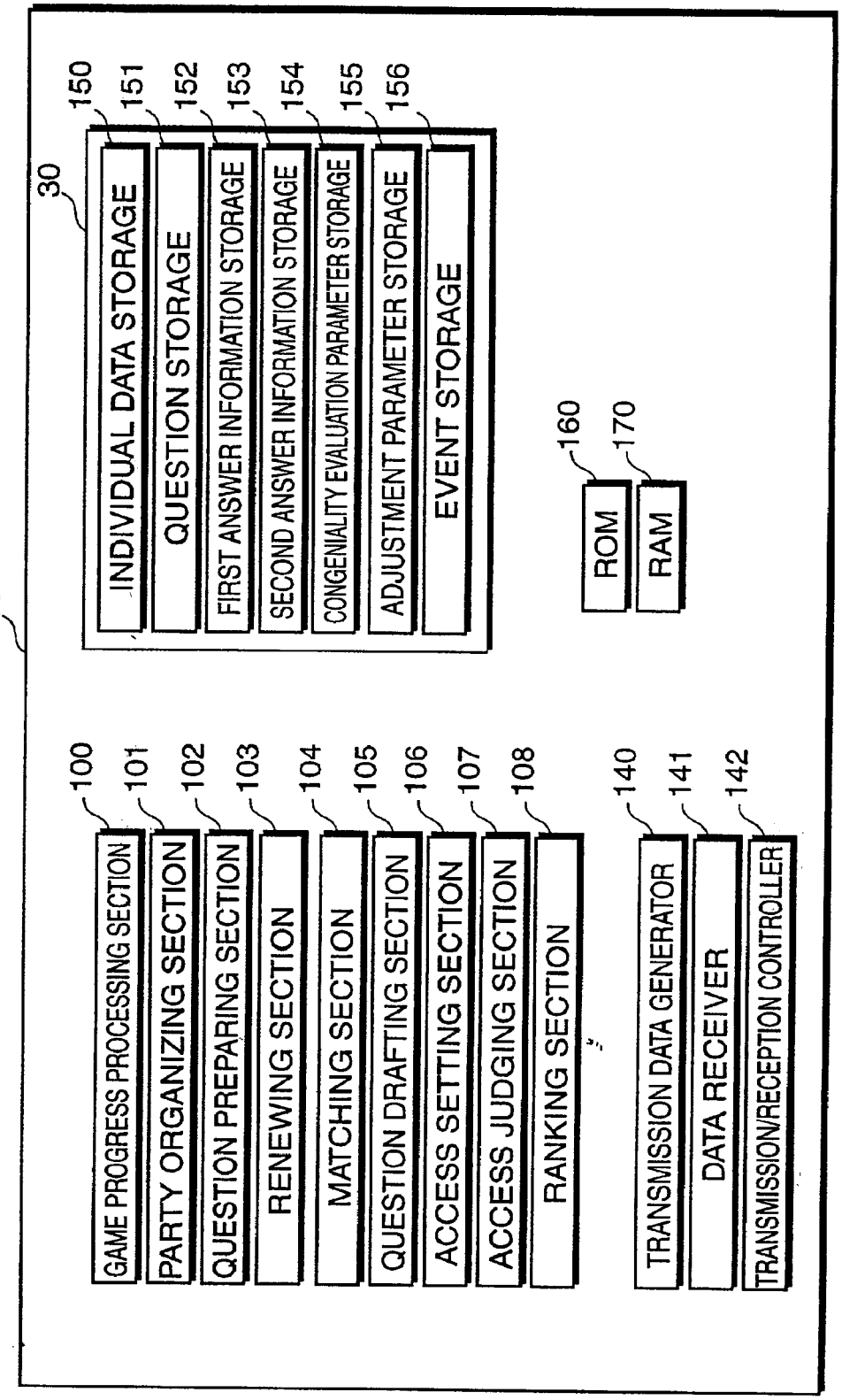
FIG. 2 is a functional construction diagram of a friendship virtual experience game unit.

The web server 1 is a specified server selected from a large number of servers operable on Internet (e.g. a provider with which a dealer operating this system have a contract), and functions as a friendship virtual experience game unit 10 along with the database server 30 as shown in FIG. 2. This game unit 10 is internally provided with hardware and software used for a friendship virtual experience game and also includes an address storage for the addresses of the mobile phones 20 and a storage for temporarily storing a mailbox data and other data transmitted from players.

The database server 30 is a server for administering an individual information and other data on members which are used for the game and, for example, stores various data and searches data. A member data is comprised of an electronic mail address of the mobile phone 20 owned by a member, and his individual information including "Nickname", "Self- Appraisal", "Sex", "Hobby", "Address", "Age" and the like inputted by means of an individual information input screen G3 to be described later.

The mail server 40 is a server for delivering mails. For example, the mail server 40 delivers a mail to the mobile phone 20 at a specified time or delivers the same mail to a plurality of mobile phones 20 registered as members.

FIG. 2 is a functional construction diagram of the friendship virtual experience game unit 10. The game unit 10 is provided with a game progress processing section 100, a party organizing section 101, a question preparing section 102, a renewing section 103, a matching section 104, a question drafting section 105, an access setting section 106, an access judging section 107 and a ranking section 108. The game progress processing section 100 controls the progress of the game. The party organizing section 101 organizes a plurality of members to participate in a virtual party. The question preparing section 102 prepares questions to be presented on monitors of the mobile communication terminal. The renewing section 103 evaluates the congeniality (or compatibility) of each possible pair of players to participate in the virtual party and cumulatively renews values of congeniality evaluation parameters. The matching section 104 selects (pairs) the two players using the congeniality evaluation parameters obtained by the congeniality evaluation. The question drafting section 105 enables the players to draft questions and possible answers. The access setting section 106 sets an access time and an access place (virtual place within the game space) in a "Meeting" mode to be described later. The access judging section 107 judges whether the player has made an access at the set access time and access place and supplies a mailbox. The ranking section 108 ranks the players in a decreasing order of mailboxes possessed by the respective mobile communication terminals of the players (i.e. the higher the players are ranked, the more mailboxes they possess).

Further, the database (storage unit) 30 is provided with an individual data storage 150, a question storage 151, a first answer information storage 152, a second answer information storage 153, a congeniality evaluation parameter storage 154, an adjustment parameter storage 155 and an event storage 156. The individual data storage 150 stores an information on virtual individuals corresponding to the respective players. The question storage 151 stores an information on various multiple-choice questions concerning hobbies and tastes which are so presented as to request the players to answer. The first answer information storage 152 stores an information on answers to the questions prepared by the question preparing section 102 in correspondence with the respective mobile communication terminals. The second answer information storage 153 stores an information on answers to the questions prepared by the question drafting section 105 in correspondence with the respective mobile communication terminals. The congeniality evaluation parameter storage 154 stores the congeniality evaluation parameters representing degrees of congeniality between participating players as parameter values. The adjustment parameter storage 155 stores adjustment parameter values set in correspondence with the information on answers to the questions. The event storage 156 stores an event information including various random events and happening events. The game unit 10 is also provided with a transmission data generator 140 for generating data to be delivered to the mobile phones 20, a data receiver 141 for receiving data transmitted from the mobile phones 20, a transmission/reception controller 142 for controlling data transmission and reception between the mobile phones 20 and the web server 1, a ROM 160 for storing a game program, predetermined values (specific numerical values) of the congeniality evaluation parameter which are necessary in judging congeniality and the like, and a RAM 170 for temporarily storing processed data.

The individual data storage 150 stores an information on a virtual individual set in correspondence with the electronic mail address of the mobile phone 20 owned by the player or an identifying certificate ID of the mobile phone 20 for each virtual individual. Each player inputs attributes such as nickname, profile, hobby, sex, area of residence and age upon registering as a member. This nickname serves as the name of the virtual individual corresponding to the player. Further, an electronic mailbox exclusively used for this game in exchanging electronic mails is allotted.

The question storage 151 stores questions given to the respective participants when a party is held. Questions prepared are such that hobby, tastes and views of love can be known through the answers to the questions, and multiple-choice questions are preferred.

The first answer information storage 152 stores an information on the answers of the players to the questions prepared in a "Party" mode to be described later in correspondence with the respective mobile communication terminals.

The first answer information storage 153 stores possible answers to the questions prepared in a "Party for Two" mode to be described later and the answers of the players to these questions in correspondence with the respective mobile communication terminals.

The congeniality evaluation parameter storage 154 stores "Degree of Congeniality": one attribute concerning the congeniality evaluation, as a parameter value, and includes memory sections corresponding to the respective pairs each comprised of two players in table format. In this embodiment, one group consists of five players. Thus, all thinkable or possible pairs, i.e. a total of 10 pairs are arranged in table format. The parameter value of each pair is renewed according to the answers of the two players forming this pair.

The adjustment parameter storage 155 stores parameter values to be added to the congeniality evaluation parameter values (Hereinafter referred to as CEP values) of the pairs that selected the same answer to the question and parameter values to be subtracted from the pairs that selected different answers in table format, and is adapted to renew the values of the congeniality evaluation parameters. This storage 155 also stores parameter values to be added to and subtracted from the CEP values of the pairs to which a sending side and a receiving side belong based on an answer information of the receiving side who received an item in an "Item Present" mode to be described later. This storage 155 further stores parameter values to be added to the CEP values of the pairs to which a sending side and a receiving side of favorable impression points belong in a "Favorable Impression Point Input" mode to be described later.

The event storage 156 stores image data and text data prepared for various events including random events and happening events, and image data and text data for screens necessary in proceeding the game.

The game progress processing section 100 displays a selectable menus by transmitting a game initial screen upon access from the mobile phone 20, judges and administers a menu selection and contents of subsequent accesses made by the player, and executes a data administration and a delivery of screens to be displayed corresponding to the contents of accesses in accordance with the game program.

The party organizing section 101 organizes a virtual party of a plurality of, e.g. five participants based on the attributes of unpaired ones of the players stored in the individual data storage 150 upon receiving a reservation for the participation in the party from the registered member.

The question preparing section 102 executes a specified question preparation processing when the virtual party is held. Questions are prepared by being selected from a large number of questions stored in the question storage 151 in accordance with a specified rule or randomly. The prepared questions are delivered upon being accessed by the mobile phone 20. A specified number of, e.g. ten questions are successively presented in response to one access.

The renewing section 103 adds the adjustment parameter values to the values of the present congeniality evaluation parameters upon receiving the answer information stored in the first and second answer information storages 152, 153.

The matching section 104 judges whether the congeniality evaluation parameter values of the respective pairs of the players participating in the virtual party have reached a predetermined value (specified numeral value) set in the ROM 160 beforehand, and selects two players whose congeniality evaluation parameter value has reached the predetermined value as a matching pair. In the case that a plurality of pairs each including one particular player have reached the predetermined value, the matching section 104 selects the pair having a higher congeniality evaluation parameter value as a matching pair.

The question drafting section 105 lets the player select questions from a plurality of questions stored in the question storage 151 and possible answers to the selected questions at will to draft the questions to be presented to a partner and possible answers wished to be chosen for the presented questions by the partner. The drafted questions are delivered upon being accessed by the mobile phone 20.

The access setting section 106 sets an access time to the server device and an imaginary meeting place (in front of station, in park, in game arcade, etc.) in the friendship virtual experience game in a "Meeting" mode to be described later.

The access judging section 107 judges an access of the two players by monitoring whether each of them has accessed at the set access time and access place. The judging section 107 judges a successful access by a fitting system if the actual access times of the two players overlap or lie within a specified time frame, e.g. 30 minutes, extending before and after the set access time. The judging section 107 also supplies mailboxes to the mobile communication terminals when judging a successful access.

The ranking section 108 ranks the members in the decreasing order based on the number of mailboxes stored in the individual data storage 150, and makes this ranking readable by all the members.

The transmission data generator 140 reads various guide screens (e.g. an individual information input screen G3, etc.) and the like from the event storage 156, and generates images of GIF format compatible with so-called i-mode as transmission data.

The data receiver 141 analyzes various data transmitted from the mobile phone 20 and executes a processing to transfer them to a specified processor or store them in the RAM 170.

The transmission/reception controller 142 is adapted for receiving data from the mobile phones 20 and carrying out packet transmission of various mail data and various screen data to the mail server 40.

Figure 3:
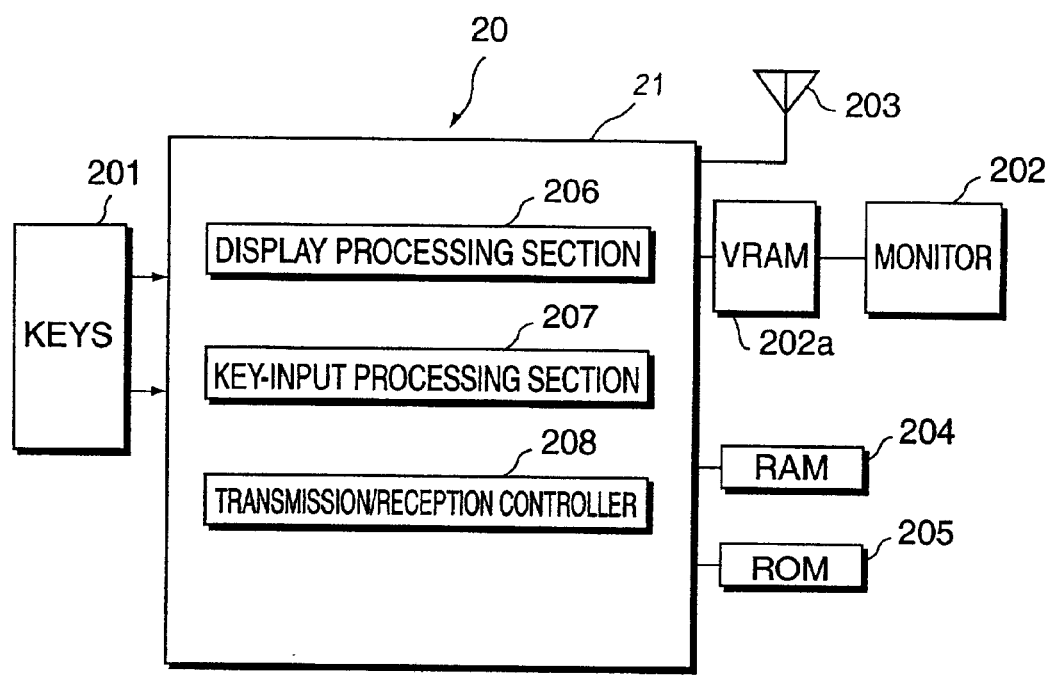
FIG. 3 is a block diagram of a mobile phone.

FIG. 3 is a block diagram of the mobile phone 20. Particularly, only functions necessary for the present invention are described. The mobile phone 20 includes a control unit 21 comprised of a computer for centrally controlling the respective elements of the mobile phone 20. This control unit 21 is provided with keys 201 as operable members, a VRAM 202a for storing image data to be displayed on a monitor 202, an antenna 203, a RAM 204 for temporarily storing input data and processed data, and a ROM 205 for storing a control program and the like.

The keys 201 include ten keys used to input telephone numbers, various function keys, a key used to switch the circuit on and off. The ten keys can also be used to input letters/characters according to setting of the function keys, thereby enabling the input of mail data and electronic mail addresses.

The VRAM 202a is adapted to temporarily store a screen to be displayed on the monitor 202 formed of a liquid crystal display or the like. The content written in the VRAM 202a is repeatedly transferred to the monitor 202 in a specified cycle, whereby this content can be viewed as a still image by the afterimage phenomenon.

A display processing section 206, a key-input processing section 207 and a transmission/reception controller 208 constructing the control unit 21 are described. The display processing section 206 causes confirmatory display of an inputted content, display of various input guide screens and display of image data transmitted from the friendship virtual experience game unit 10 to be made on the monitor, and causes the contents of the mails to be displayed on the monitor. This display processing section 206 includes a capacity for storing an image data of at least one screen. For example, in a mode in which only part of an image is displayed on the monitor 202, the displayed image is vertically scrolled as a specific one of the keys 201 is operated, so that the entire image can be viewed. The key-input processing section 207 generates an information according to the operation of the keys 201.

The transmission/reception controller 208 receives data from usual wireless public circuits, controls transmission circuits, transmits and receives sound data, and transmits and receives data of electronic mails used via Internet and the like. The data are transmitted or received via the antenna 206. An image data is transmitted from or received by the mobile phone 20 in packet format after being compressed in GIF format.

Here, a basic procedure of this game is described. The player accesses to the web server 1 via the mobile phone 20, has a game image information as a game data and various other image information (image information is comprised of at least either an image data or a text data) delivered from the friendship virtual experience game unit 10 of the web server 1 to his mobile phone 20, and the delivered images are displayed on the monitor 202 of the mobile phone 20. The game is proceeded in such a manner that the player responds to instructions (numbers of multiple-choice questions, etc. in this embodiment) given in the images displayed on the monitor 202. The response data (number data) is transmitted as a game data to the friendship virtual experience game unit 10, a specified evaluation processing as a game processing is executed according to this data to renew the congeniality evaluation parameter values between the players. By repeating such data transmission and reception and evaluation processing a specified number of times, the two players are finally selected based on their congeniality evaluation parameter value and a data on this selection is transmitted to the mobile phones 20 of the players via the mail server 40 and the network center 50.

Figure 4:
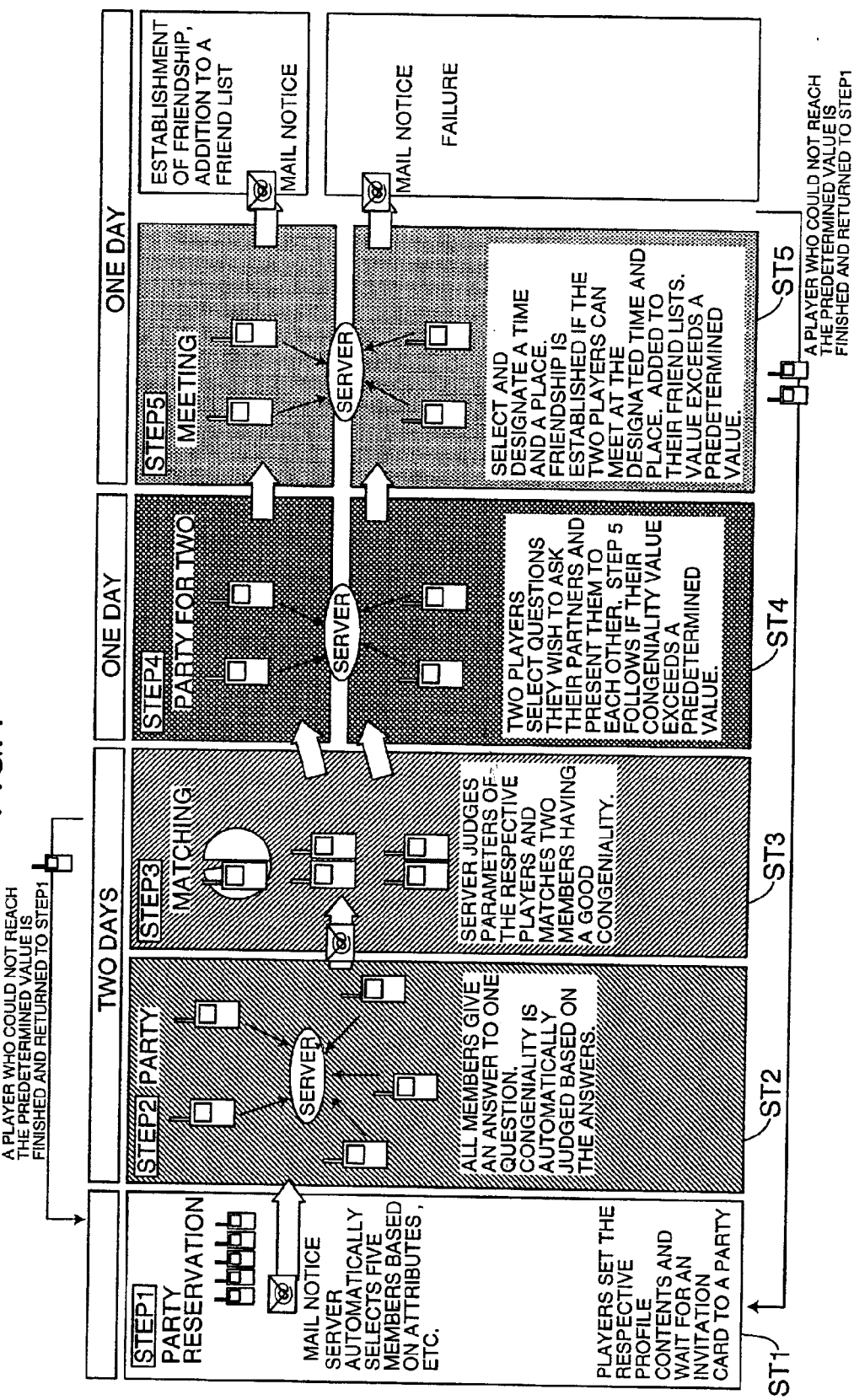
FIG. 4 is a diagram showing a progress of a game from the start of the game to the end thereof.

FIG. 4 is a diagram showing a progress of the game from the start to the end. This friendship virtual experience game is comprised of five Steps: "Party Reservation" mode in Step ST1, "Party" mode in Step ST2, "Matching" mode in Step ST3, "Party for Two" mode in Step ST4 and "Meeting" mode in Step ST5. The duration of one game is five days in this embodiment. First, in the "Party Reservation" mode, the player reserves a virtual party he wishes to participate in (Step ST1). In the "Party" mode, five players are selected from those who reversed the above virtual party and all of them answer questions delivered to them (Step ST2). In the "Matching" mode, compatibilities with other four players are judged for each selected player, and the two players whose congeniality evaluation parameter value has reached the predetermined value are selected as a matching pair (Step ST3). In the "Party for Two" mode, the selected two players select questions wished to be presented to the partners and possible answers wished to be chosen for the selected questions and present these questions. Upon judging that the congeniality evaluation parameter value has reached a predetermined value, an advance to the "Meeting" mode in Step ST5 is permitted (Step ST4). An access time and an access place in the contents are instructed to these two players, the two players make an access at the instructed time and place, and processing is executed as a result of an establishment of friendship upon judging that the two players could meet each other, thereby giving a mailbox to each of them (Step ST5).

Figure 5:
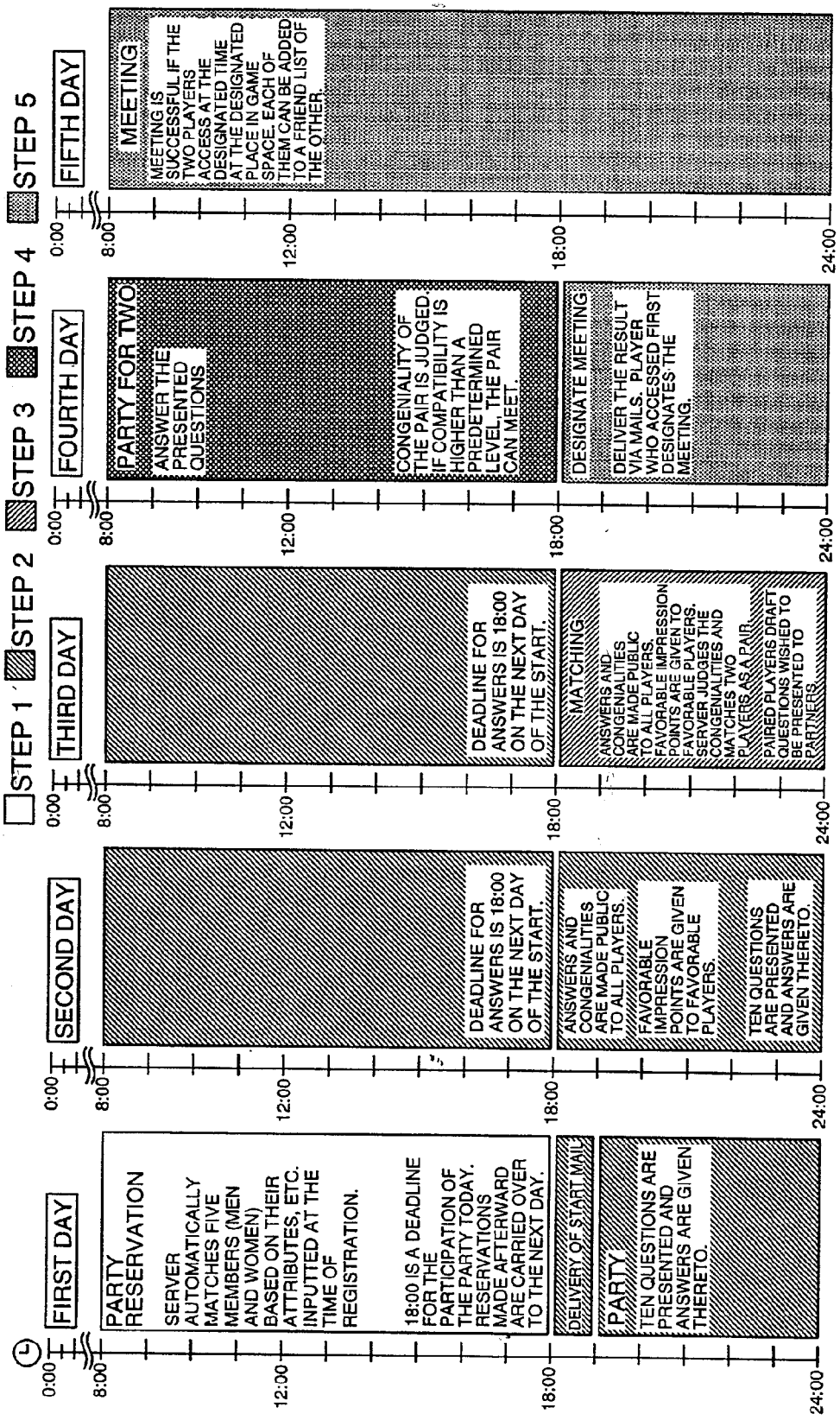
FIG. 5 is a diagram showing an example of passage of time from reservation of a virtual party to meeting.

FIG. 5 is a diagram showing an example of passage of time from reservation of a virtual party to meeting. The time in this embodiment is actual time. A specified period of the first day, e.g. from 8:00 AM to 6:00 PM, is a period during which the party can be reserved. If a reservation is made after 6:00 PM, this reservation is carried over to the next day. The virtual party starts at 6:00 PM and, for example, 10 questions are presented and the participants' answers are received. The deadline for the answers is 6:00 PM on the second day, so that the answers and compatibilities of all the participants can be made public at 6:00 PM. A "Favorable Impression Point Input" mode in which favorable impression points are given to favorable players is permitted, and another 10 questions are presented to the participants to be answered. The deadline for these answers is 6:00 PM on the third day, so that the answers and compatibilities of all the participants can be made public at 6:00 PM. Here, the "Favorable Impression Point Input" mode in which favorable impression points are given to favorable players and an "Item Present" mode in which virtual presents can be given are permitted. Then, a pair of players are selected by the congeniality judgment.

The selected two players are enabled to draft questions wished to be presented to the partners and possible answers wished to be chosen by the partner. This operation is accepted until midnight, and the server 1 automatically prepares questions and possible answers in the case that they are not prepared until midnight. The answers to the prepared questions are received between 8:00 AM and 6:00 PM on the fourth day, the congeniality of the two players is judged, and an advance to the "Meeting" mode is permitted if the congeniality evaluation parameter value has reached the predetermined value. Specifically, one of the selected two players who first accessed between 6:00 PM and midnight is permitted to instruct meeting time and place. A period between 8:00 AM and midnight on the fifth day is a period during which the selected two players can meet each other.

If they make accesses at the instructed time and at the instructed place in the game space, a mailbox is given to each of them upon judging that the meeting was successful.

Figure 6:
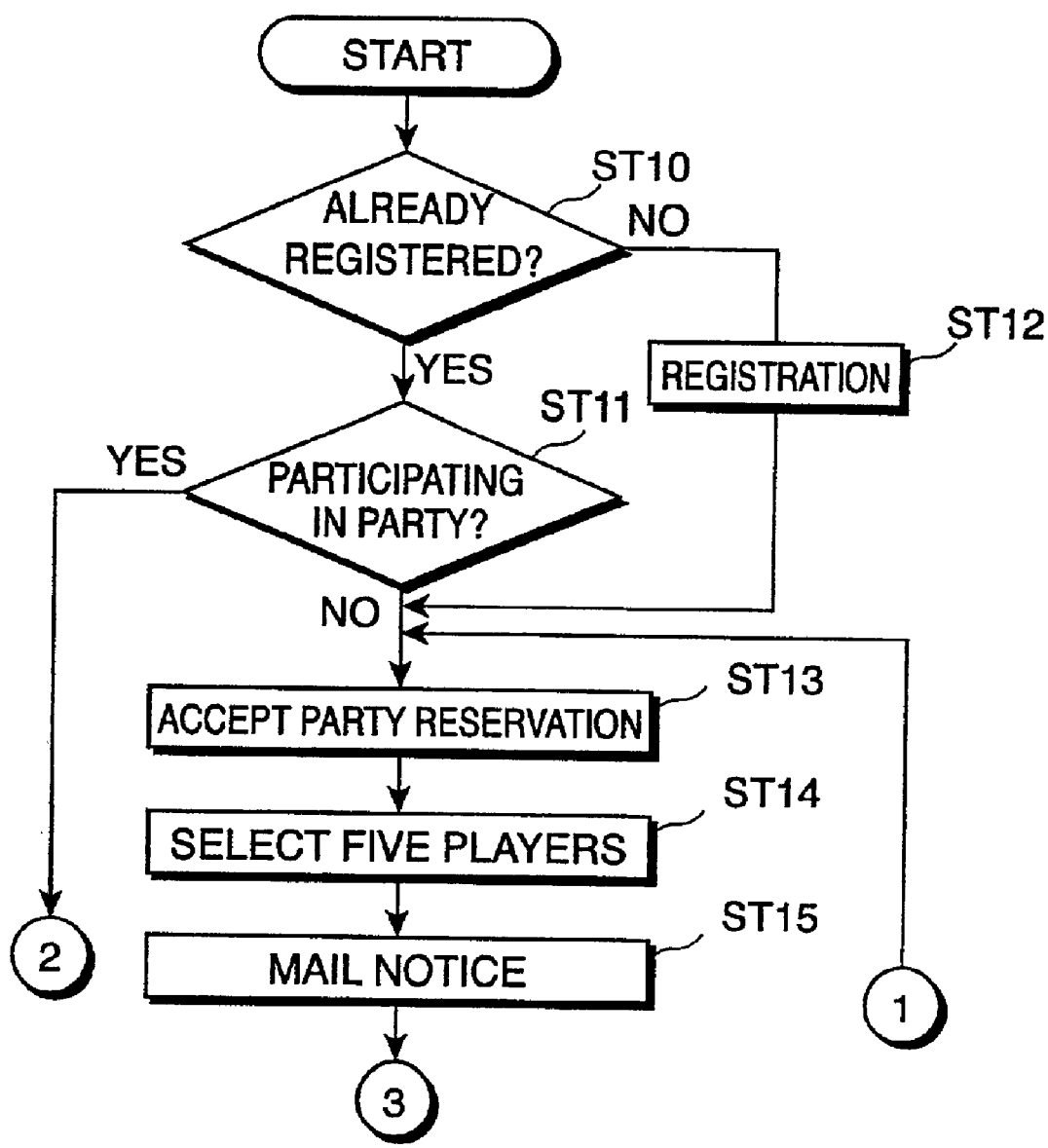
FIG. 6 is a flow chart showing a procedure of the game in a "Party Reservation" mode.

FIG. 6 is a flow chart showing a procedure of the game in the "Party Reservation" mode. First, the game is started and it is judged whether a player was already registered as a member (ST10). If a player who has accessed is not registered as a member yet (NO in Step ST10), this routine proceeds to Step ST12 to perform a member registration processing. On the other hand, if the player is already registered as a member (YES in Step ST10), it is judged whether he is participating in the party (Step ST11), and Step ST16 follows if he is participating while this routine proceeds to the "Party Reservation" mode if he is not. In this "Party Reservation" mode, one party which the player wishes to participate in can be selected from a plurality of virtual parties (Step ST13). Then, the party organizing section 101 selects five members from those who reserved this party (Step ST14) and inform the selected members of their having been selected and a game starting time via electronic mails (Step ST15).

Figure 10:
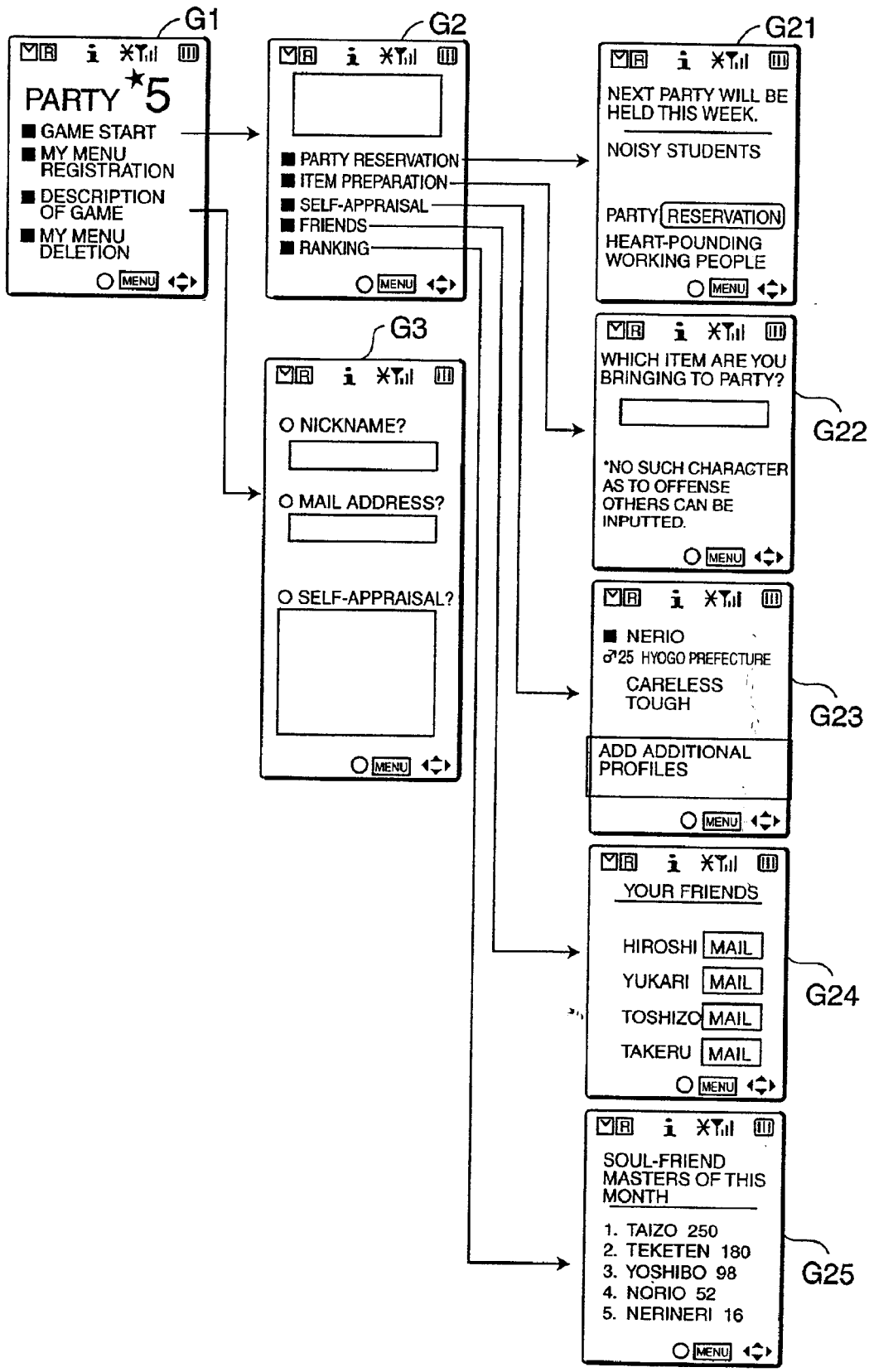
FIG. 10 is a diagram showing exemplary screen images showing the progress of the game in the "Party Reservation" mode.

FIG. 10 is a diagram showing exemplary screen images showing the progress of the game in the "Party Reservation" mode. Identified by G1 is an initial menu screen in this friendship virtual experience game. Upon an access of the player to this game, the initial menu screen G1 is read from the event storage 156 and displayed on the monitor 202 by the game progress processing section 100. The game title and messages are displayed in this screen G1, and links to the respective pages are displayed therebelow. All players start the game from this initial menu screen G1.

If "Game Start" is selected in the initial menu screen G1, a screen G2 comes up. The screen G2 is a "Home" menu screen, wherein "Party Reservation", "Item Preparation", "Self-Appraisal", "Friends" and "Ranking" are selectable. If "Party Reservation" is selected in the "Home" menu screen G21, a screen G21 comes up. In the "Party Reservation" mode screen G21, the names of virtual parities within contents to be held are displayed to accept a reservation of a virtual party the player wishes to participate in. When the player makes a party reservation, the party organizing section 101 selects, for example, five members based on the individual information stored in the individual data storage 150. If "Item Preparation" is selected, a screen G22 comes up. In the "Item Preparation" mode screen G22, preparation of an item which can be given as a present in the "Item Present" mode is permitted to the player. Here, a specified number of, e.g. eight characters or less can be freely inputted. If "Self-Appraisal" is selected, a screen G23 comes up. In the "Self-Appraisal" mode screen G23, the player's profile is displayed. By selecting "Additional Profile Contents", various "Degrees" (of looks, fashion, etc.) can be additionally inputted, thereby renewing the individual information stored in the individual data storage 150 by the inputted data. If "Friends" is selected, a screen G24 comes up. In the "Friends" mode screen G24, a list of friends the player has made thus far is displayed. Further, by selecting "Mail", the player is permitted to send a free mail to the friend he already made. A specified number of characters can be inputted for the free mail, and mails are, for example, sent to and received from specified mailboxes with a view to communication with friends gained in the "Meeting" mode in Step ST5. If "Ranking" is selected, a screen G25 comes up. In the "Ranking" mode screen G25, the players having made many friends (obtained many mailboxes) thus far are displayed while being ranked.

In this embodiment, the number of characters that can be sent by the free mail is set to vary depending on the number of successful "Meetings", and setting is made so that only five characters can be sent by the player at first. The number of the characters that can be sent increases by three every time "Meeting" succeeds, and up to a maximum of 29 characters can be inputted.

In this embodiment, the game progress processing section 100 is provided with a prohibiting (character-check filtering) function of prohibiting the input of characters and words the use of which is regarded to be improper in order to check the contents of the free mails sent to the mailboxes. Since the characters are processed by being converted into character codes, a list of prohibited character codes is stored beforehand, the character code inputted by the player is collated every time and the player is informed of it to prohibit the input of the characters corresponding to the coinciding codes. After the receipt of the input, whether or not the prohibited character is included is checked and, if it is included, a display mode to inform the player of it is taken and a partial correction is permitted. Known "Deletion" and "Insertion" processings in character input may be combined. In addition to characters, words are stored in a list as combinations of a plurality of codes and are similarly checked.

In this game, an information exchange concerning electronic mail addresses is prohibited and, accordingly, the input of words essential in specifying the electronic mail addresses and the input of characters of half size are prohibited. Further, characters and words for specifying actual places and date/time are available in the form of lists, and the input thereof is prohibited. In this way, the morals of the player participating in this game and morals among the players are maintained.

If "My Menu Registration" is selected in the initial menu screen G1, the screen G3 comes up. The "My Menu Registration" mode screen G3 is an individual data input screen, and the inputted data are stored in the individual data storage 150. "Nickname" inputted here is stored as a virtual individual in the game.

Figure 7:
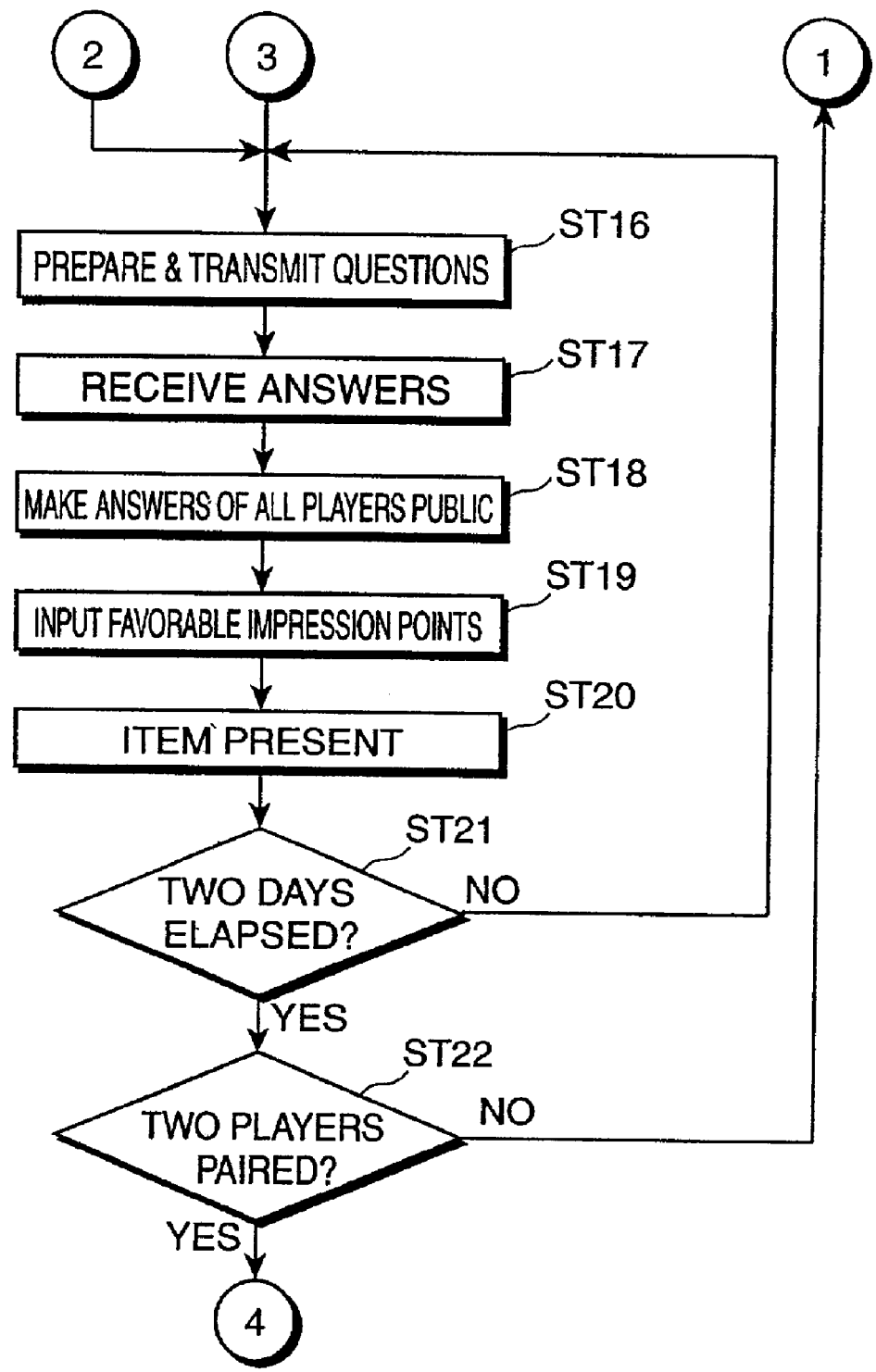
FIG. 7 is a flow chart showing a procedure of the game in a "Party" mode and a "Matching" mode.

FIG. 7 is a flow chart showing a procedure of the game in the "Party" mode and the "Matching" mode. First, the question preparing section 102 prepares, for example, ten questions to be presented to all the participating players and delivers these questions to them (Step ST16). Then, the answer information of each participating player to these questions is received and stored in the first answer information storage 152 (Step ST17). If no answer information is received, a processing is carried out, assuming that this player has not answered. An answering method is preferably a multiple-choice method for selecting one answer from a plurality of possible answers or choices. The renewing section 103 adds a predetermined value to the values of the congeniality evaluation parameters which are degrees of congeniality with the respective participating players based on the answer information stored in the first answer information storage 152.

Upon reaching a predetermined time, the answers of all the participating players are made public (Step ST18). Then, the input of the "favorable impression points" to favorable players, i.e. "Favorable Impression Point Input" mode, is permitted (Step ST19). When the "favorable impression points" are inputted, the renewing section 103 adds a predetermined value to the congeniality evaluation parameter value and stores the resultant in the congeniality evaluation parameter storage 154. The game progress processing section 100 permits each player to give the virtual item prepared in Step ST13 as a present to one participating player by permitting the "Item Present" mode (Step ST20). An event is delivered to each player having received the present next time he makes an access, and the renewing section 103 adds a predetermined value to the congeniality evaluation parameter value based on the answer information and stores the resultant in the congeniality evaluation parameter storage 154.

The procedure of the above Steps ST16 to ST20 is carried out a specified number of times, for example, twice within two days. This routine proceeds to Step ST22 upon the lapse of two days while returning to Step ST16 if two days have not elapsed yet (Step ST21). The matching section 104 selects two players whose congeniality evaluation parameter value is equal to or larger than the predetermined value, enabling this routine to proceed to Step ST23. If the congeniality evaluation parameter values of the possible pairs of the participating players are all below the predetermined value, this routine returns to Step ST13 (Step ST22).

Figure 11:
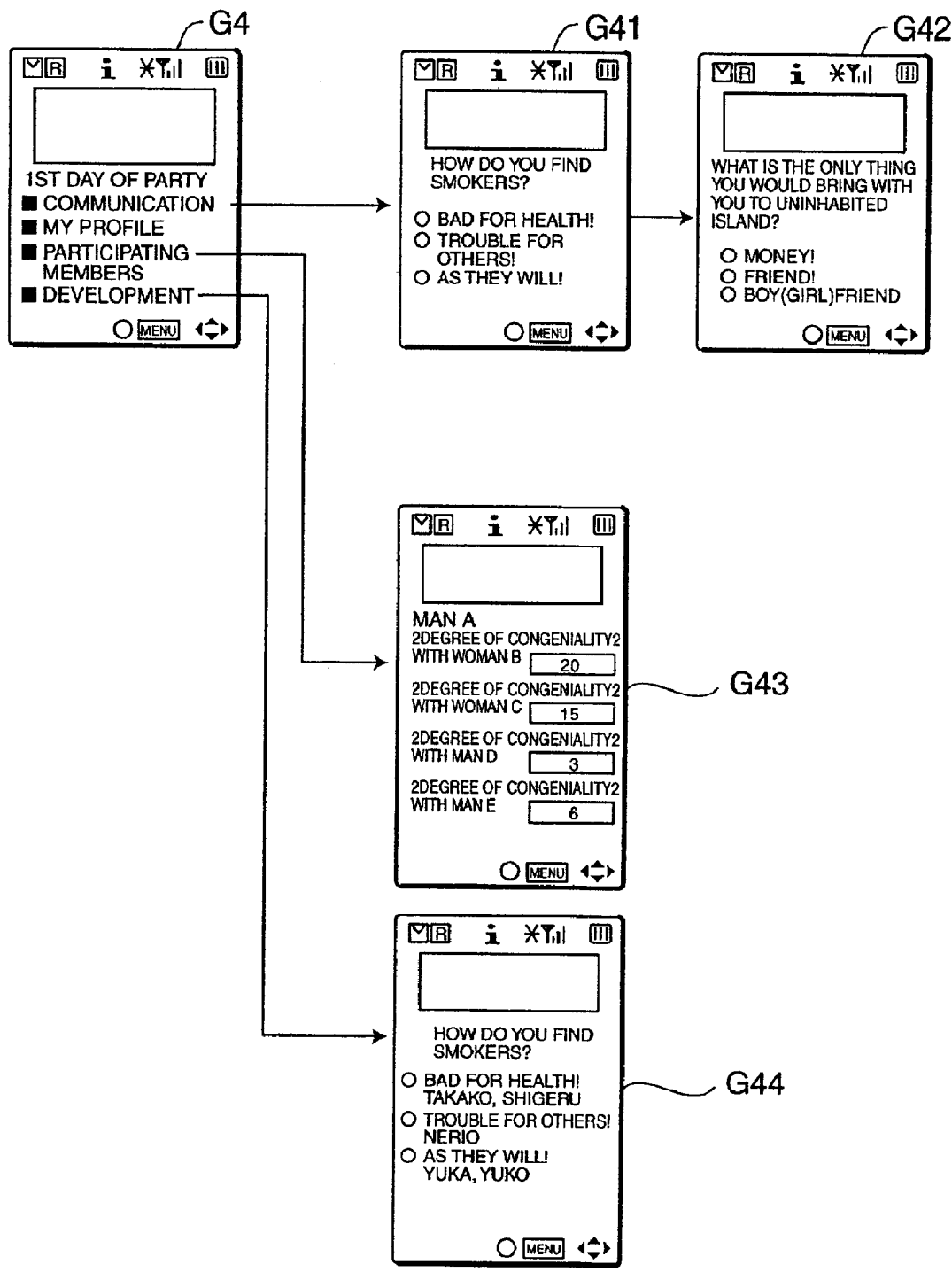
FIG. 11 is a diagram showing exemplary screen images showing the progress of the game in the "Party" mode.

FIG. 11 is a diagram showing exemplary screen images showing the progress of the game in the "Party" mode. In the case that the "Party Reservation" was already made in Step ST13, a screen G4 automatically comes up if "Game Start" is selected in the initial menu screen G1. If "Communication" is selected in the screen G4, a screen G41 comes up. Screens G41 and G42 are examples of the questions to be presented. For example, ten questions prepared by the question preparing section 102 are presented in a multiple-choice format to all the players participating in the party. In the example of the screen G41, one answer is selected from three possible answers. When one answer is selected from the possible answers by the player, a next question screen G42 comes up and succeeding questions are successively presented up to the tenth question. When all the participants completely answer, the congeniality evaluation parameter values are renewed based on the answer information. The congeniality evaluation parameter value is increased by a predetermined value when the answers to the same question coincide. By selecting "Participating Members" in the screen G4, the congeniality evaluation parameters are shown to the respective players as "Degrees of Friendship" in the screen G43. A screen G44 comes up if "Development" is selected in the screen G4. In the screen G44, the answer information of each player to the presented questions is read from the first answer information storage 152 and displayed.

Figure 8:
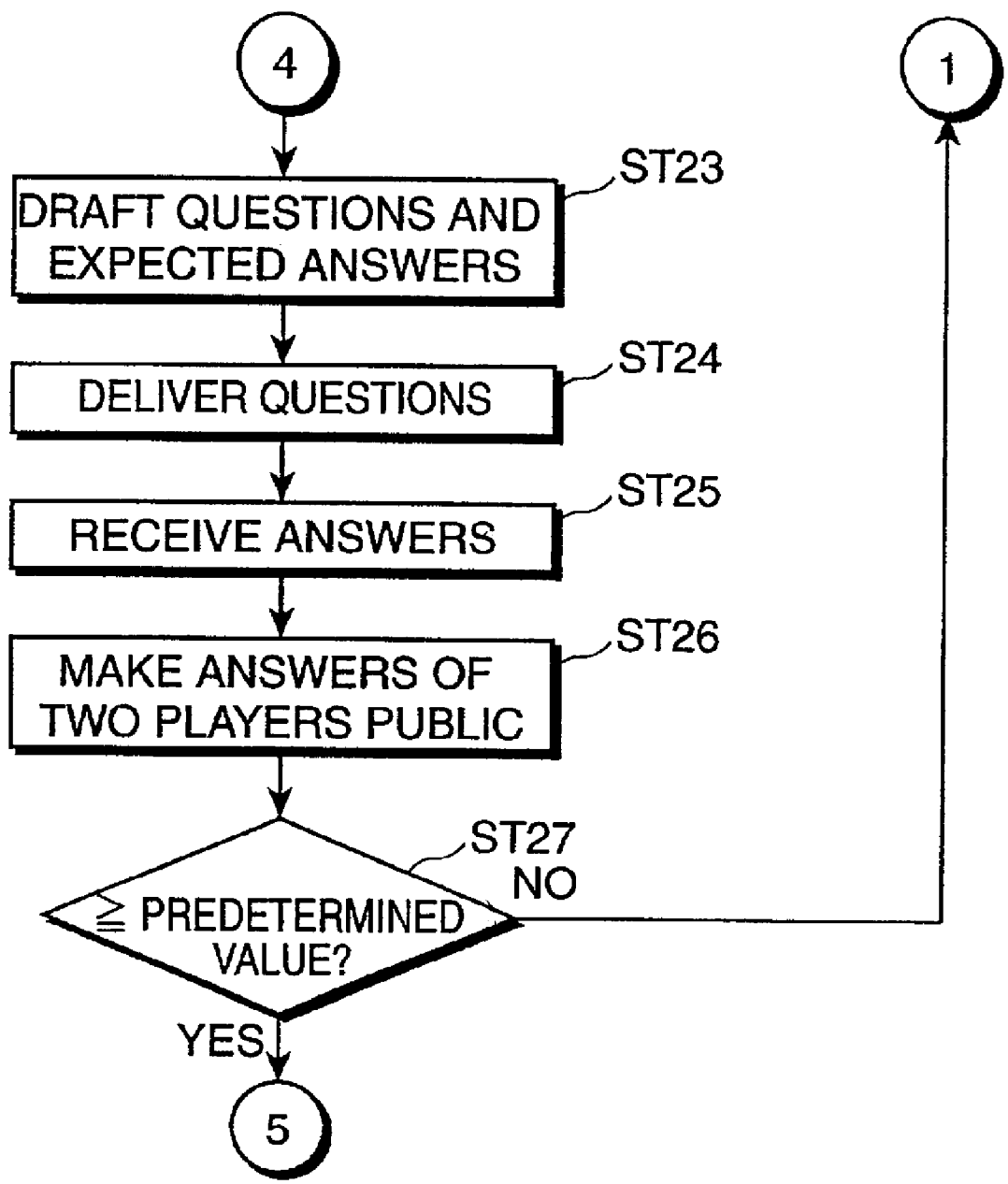
FIG. 8 is a flow chart showing a procedure of the game in a "Party for Two" mode.

FIG. 8 is a flow chart showing a procedure of the game in the "Party for Two" mode. First, the question drafting section 105 permits each of the selected two players to select and prepare 10 questions to be presented to the partner and possible answers wished to be selected by the partner. Here, if the players prepare neither the questions nor the possible answers, the questions and the possible answers are randomly selected and prepared (Step ST23). The questions prepared by the respective players are delivered (Step ST24), the answer information from the players is received and stored in the second answer information storage 153 (Step ST25). Here, in the case of receiving no answer within a predetermined time, a processing is carried out, assuming that this player has not answered. The answer information of each player is made public (Step ST26), and the renewing section 103 adds a predetermined value to the congeniality evaluation parameter value if the answer information stored in the second answer information storage 153 coincides with the answers prepared in Step ST23 and stores the renewed congeniality evaluation parameter value in the congeniality evaluation parameter storage 154. An advance to Step ST28 is permitted if the congeniality evaluation parameter value of the two players has reached the predetermined value while a return to Step ST13 is forced if it has not reached the predetermined value (Step ST27).

Figure 12:
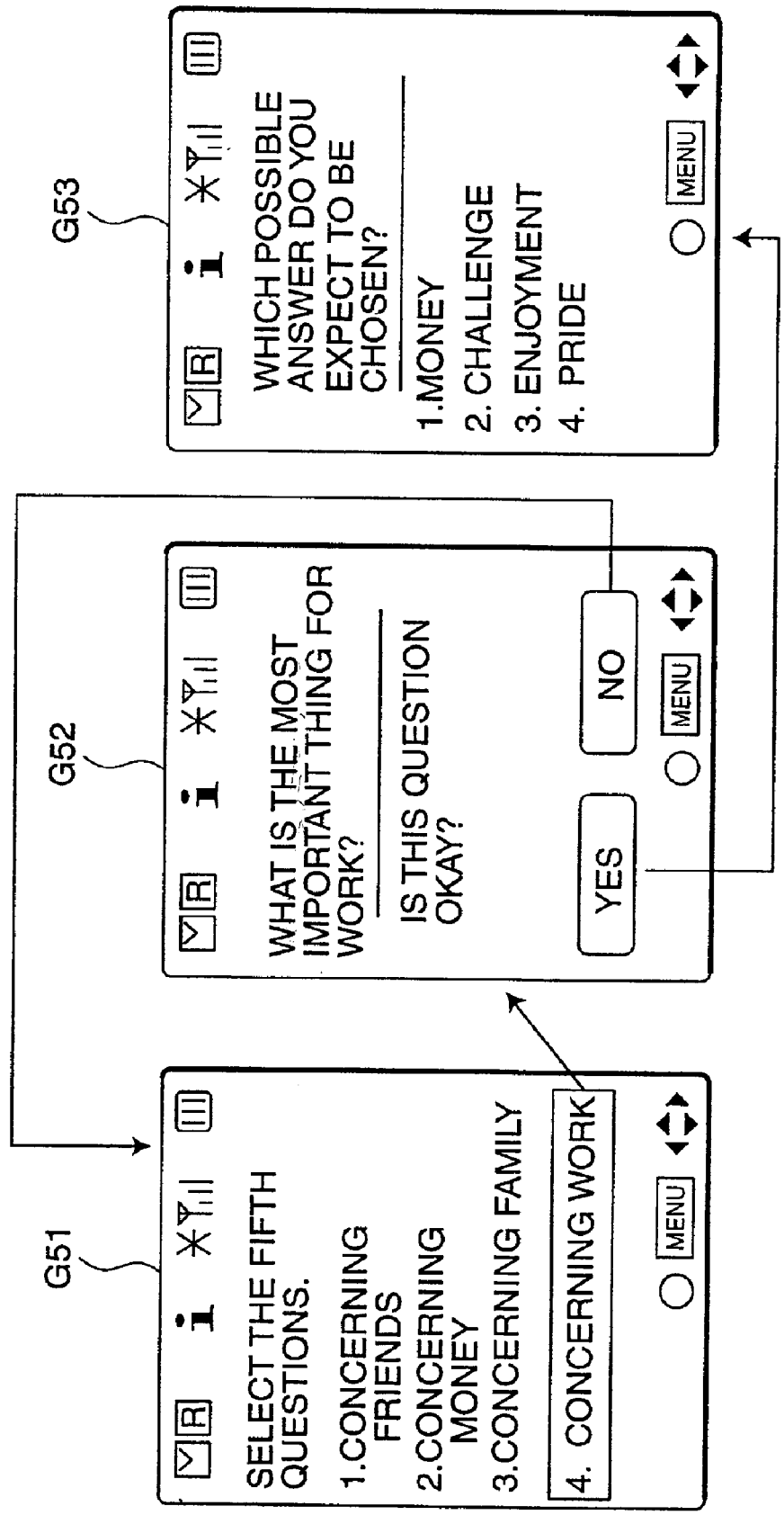
FIG. 12 is a diagram showing exemplary screen images showing a method for drafting questions and possible answers in the "Party for Two" mode.

FIG. 12 is a diagram showing exemplary screen images showing a method for preparing the questions and the possible answers in the "Party for Two" mode. The player is caused to select one subject from a plurality of subjects as in a screen G51. For example, if "Concerning Job" is selected, a screen G52 comes up. A screen G53 comes up if "Yes" is selected in the screen G52, whereas the screen G51 comes up again if "No" is selected in the screen G52. In the screen G53, the player is let to select an answer wished to be selected by the partner. In the case of preparing, for example, ten questions, the above procedure is repeated ten times.

Figure 9:
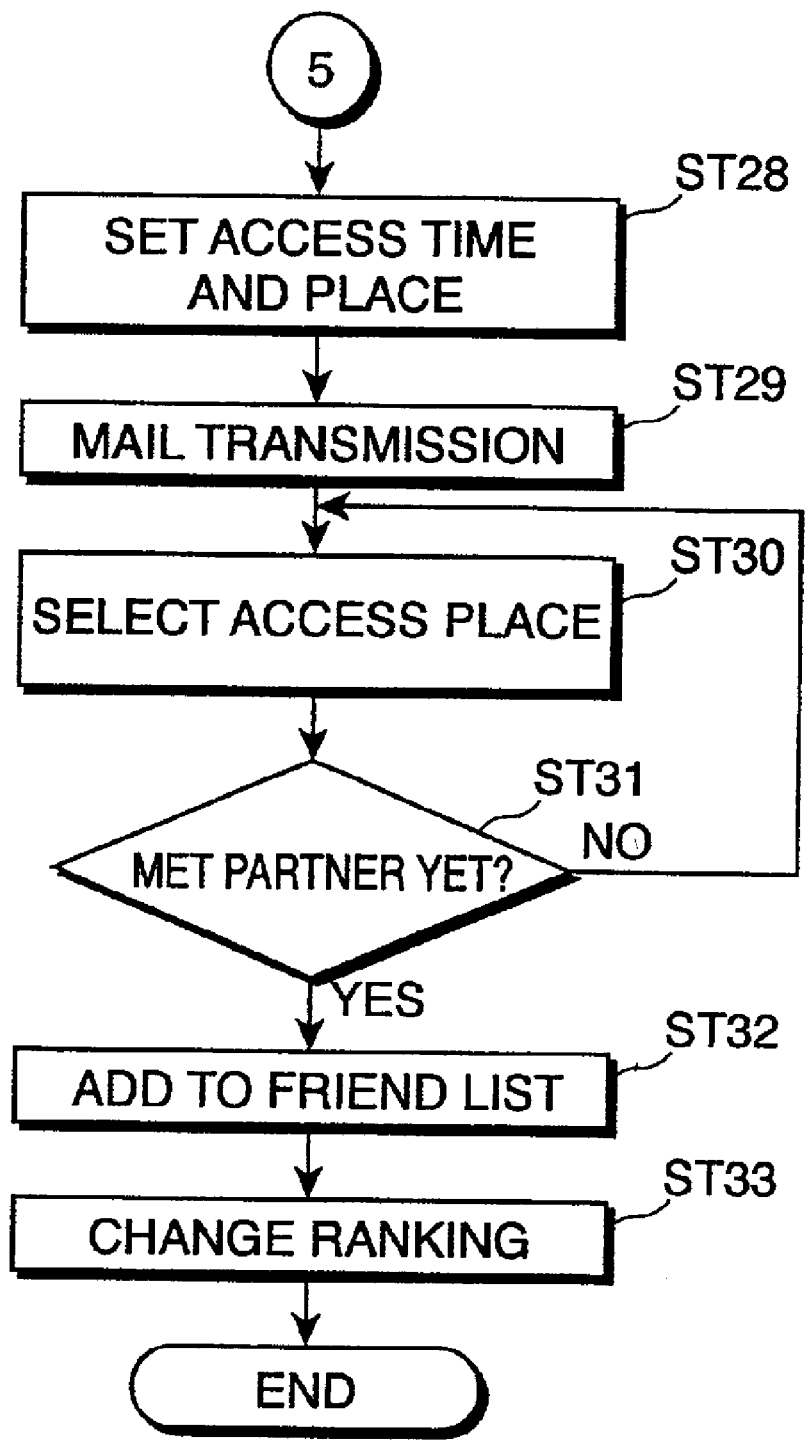
FIG. 9 is a flow chart showing a procedure of the game in a "Meeting" mode.

FIG. 9 is a flow chart showing a procedure of the game in the "Meeting" mode. In Step ST27, the access setting section 106 permits one of the two players having a congeniality evaluation parameter value equal to or larger than the predetermined value, who accessed first, to set a time to access the game unit (e.g. period of time from 8:00 AM to 24:00 on the next day) and an imaginary meeting place in the game space (e.g. a clock tower in front of station, a bench at shopping district, etc.) (Step ST28). The transmission/reception controller 142 transmits the time and place set in Step ST28 to the partner via a mail (Step ST29). If an access is made to the game unit at the instructed time, the meeting place can be selected (Step ST30). If the place instructed in Step ST28 is selected, the access judging section 107 judges whether the partner has also accessed (Step ST31). If the two players are judged to have accessed at the same place, a mailbox of the individual data storage 150 is given to each of them, assuming that friendship has been established (Step ST32). If the two players are judged to have accessed at different places, this routine returns to Step ST27 to enable the player to select another place. Then, the ranking sections 108 ranks the players in a decreasing order of the mailboxes obtained (Step ST33).

Figure 13:
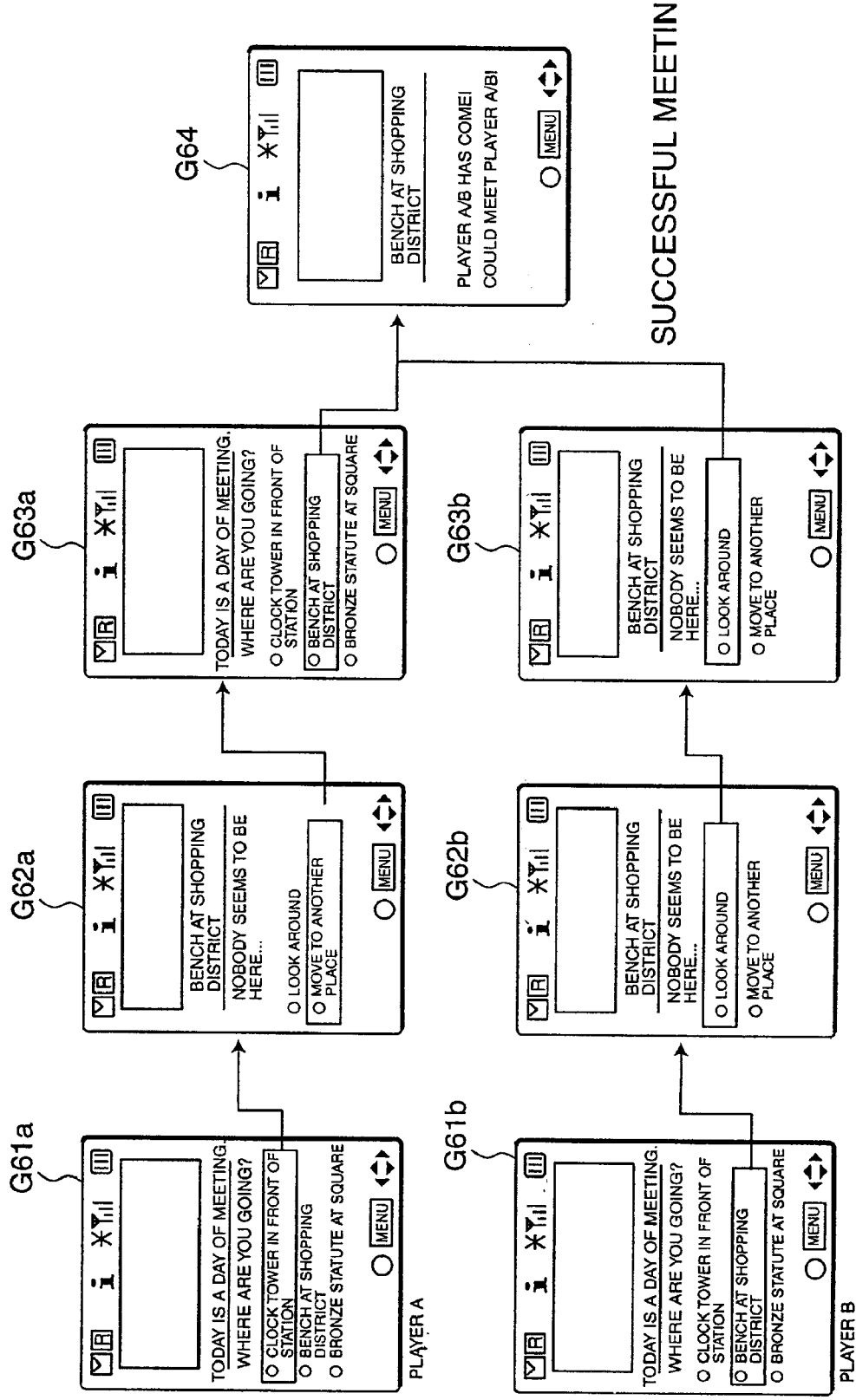
FIG. 13 is a diagram showing exemplary screen images showing the progress of the game in the "Meeting" mode.

FIG. 13 is a diagram showing exemplary screen images showing the progress of the game in the "Meeting" mode. First, if an access is made to this game at the instructed meeting time, a screen G61a or G61b automatically comes up. An example described here is such that two players, A and B, access to each other at a "Bench at Shopping District". If the player A selects a "Clock Tower in front of Station" in a screen G61a, a screen G62a comes up. Here, the access is not successful since the meeting place is a "bench at shopping district", and a screen G63a comes up if "Move to Another Place" is selected. On the other hand, if the player B selects the "Bench at Shopping District" in the screen G61b, a screen G62b comes up. In the screen G62b, "Meeting" is not successful since the player A has accessed to the "Clock Tower in front of Station". If "Look Around" is selected, a screen G63b comes up. In the screen G63b, if "Look Around" is selected again, a successful "Meeting" is judged since the player A has also accessed to the "Bench at Shopping District" and a screen G64 comes up. The screen G64 is a screen displayed when the two players succeeded in "Meeting".

Figure 14:
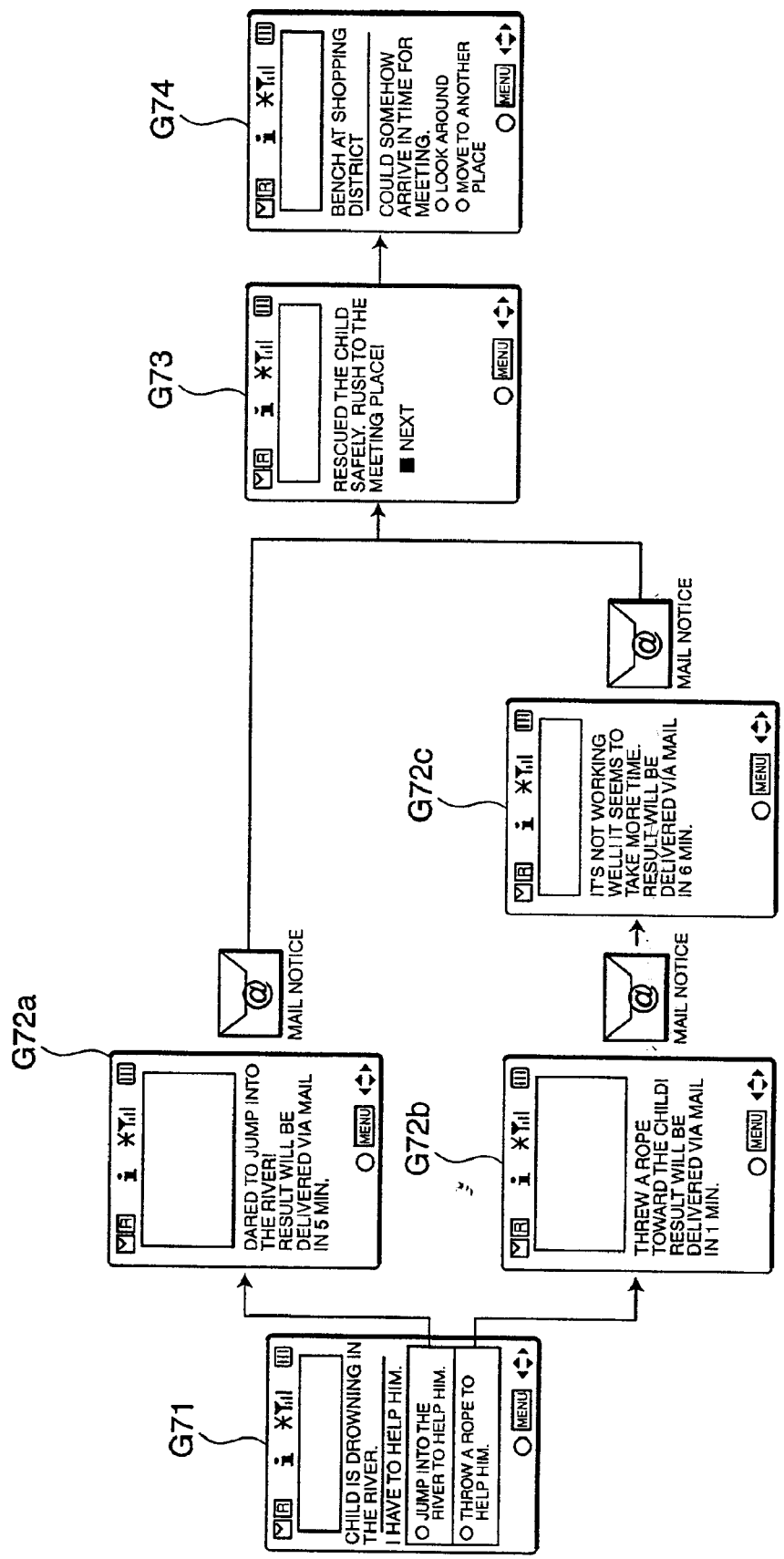
FIG. 14 is a diagram showing exemplary screen images showing the progress of the game upon a happening event in the "Meeting" mode.

FIG. 14 is a diagram showing exemplary screen images showing the progress of the game upon a happening event in the "Meeting" mode. Various happening events are stored in the event storage 156 and are randomly read therefrom in the "Meeting" mode. A screen G71 shows an example of the happening event. If "Jump into River to Help a Child" is selected, a screen G72a comes up. If "Throw a Rope to Help a Child" is selected, a screen G72b and then a screen G72c come up. A predetermined time is set to clear each happening event, and the result of the event is notified to each player after the elapse of a specified time via an electronic mail and then a screen G73 comes up. If "Next" is selected, a screen G74 comes up to show a successful access at the meeting place.

Although the renewing section 103 adds predetermined values to the congeniality evaluation parameter values in the foregoing embodiment, not only addition, but also subtraction may be carried out according to the present invention. In such a case, the renewing section 103 subtracts a predetermined value from the congeniality evaluation parameter value based on the parameter value stored in the adjustment parameter storage 155.

In the foregoing embodiment, the access judging section 107 gives a mailbox to each of the two players selected as a matching pair if they are judged to have accessed at the set time and place. However, the present invention is not limited thereto. For instance, mailboxes may be given when the two players selected as a matching pair are judged to be highly compatible.

Although the mailbox is given upon getting a friend to enable a mail transmission in the foregoing embodiment, music as a receiving sound reproducible in the mobile phone 20 of the player, an image as a so-called wallpaper, a common premium as a memento to have become friends may also be sent upon getting a friend.

Although the mobile communication devices, particularly the mobile phones 20 are described as terminals in the foregoing embodiment, the present invention is not limited thereto. The terminals may be telephone circuits, Internet, personal computers connected with networks (wired, wireless) such as electronic mails, game devices for home use, and the like.

In summary, a server device for a net game applicable on a network and enabling data communication with mobile communication terminals registered as members, the server device comprising: organizing means for organizing groups consisting of a specified number of members upon a member registration request from the respective mobile communication terminals, question storage means for storing contents of a plurality of questions, question preparing means for selecting and preparing a specified number of questions from the contents stored in the question storage means, transmitting/receiving means for transmitting the prepared questions to the respective mobile communication terminals in the group and receiving an answer information from the respective mobile communication terminals corresponding to the questions presented on monitors of the respective mobile communication terminals, first answer information storage means for storing the answer information in correspondence with the respective mobile communication terminals, and congeniality judging means for judging the congeniality of each possible pair of the respective mobile communication terminals in the group based on the respective pieces of answer information stored in the first answer information storage means and pairing the mobile communication terminals having the answer information showing congeniality.

With the aforementioned form of invention, the registered members are organized into groups consisting of a specified number of members, a specified number of questions to be presented to the respective grouped mobile communication terminals are selected and prepared, the prepared questions are transmitted to the respective mobile communication terminals, and the answer information from the mobile communication terminals corresponding to the questions presented on the monitors of the mobile communication terminals are received. Two members are selected as a matching pair by storing the answer information in correspondence with the respective mobile communication terminals and judging the congeniality of each possible pair of the mobile communication terminals in the group based on the stored contents.

In addition, the aforementioned server device may further comprise question drafting means for letting one of the paired mobile communication terminals draft a specified number of questions and expected answers thereto based on the storage contents of the question storage means in order to transmit the questions and the possible answers to the partner, second answer information storage means for storing the questions transmitted from the one of the paired mobile communication terminals and an information on answers transmitted from the partner mobile communication terminal in correspondence with the respective mobile communication terminals, and information exchanging means for judging a degree of congeniality based on the respective pieces of answer information stored in the second answer information storage means and said expected answers and permitting an information exchange to the paired mobile communication terminals if the degree of congeniality is high.

With this construction, the two members selected as the matching pair can confirm each other whether they can become compatible friends by judging the congeniality of these two, and the information exchange is enabled if the congeniality is judged to be high.

Furthermore, it is possible to set such that the question drafting means enables the paired mobile communication terminals to select the questions and the expected answers from the storage contents of the question storage means and to draft a specified number of questions.

With this construction, the players themselves can set questions to be presented to the partners and answers they wish the partners to choose, so that they can know their partners better.

The information exchange means in the aforementioned server device can be set to include access setting means for permitting the paired mobile communication terminals selected to set an access time and an imaginary place in a game space, and an access judging means for judging whether an access has been made at the set access time and place by both players through the paired mobile communication terminals respectively. With this construction, the information exchange means can let the paired mobile communication terminals set the access time to the server device and the imaginary place in the game space and can judge whether the paired mobile communication terminals have made an access at the set access time and place. A feeling as if the players would actually meet can be experienced in the game, making the net game more interesting and enjoyable.

In the aforementioned server device, it is possible to set such that a mailbox is given to each of the paired mobile communication terminals judged to have accessed by the access judging means. With this construction, in the case of a successful meeting (access), mails can be exchanged via the mailboxes on the server.

In addition, the aforementioned server device may further comprise individual data storage means for storing possession information of mailboxes in correspondence with the registered members. With this construction, it can be known how many mailboxes given by this game the respective members possess.

Moreover, the aforementioned server device may further comprise ranking means for ranking the members in a decreasing order of possessed mailboxes and making the ranking readable in the server device. With this construction, the more friends the players have, the higher they are ranked. This makes the game more interesting and enjoyable and motivates the players to continue the game.

The present invention is also directed to a program for executing a net game on the aforementioned server device, a computer-readable storage medium storing a net game progress control program implementable on the aforementioned net game server device, and a net game progress control method as defined in the following section.

This application is based on Japanese Patent Application Serial No. 2001-012360 filed in Japanese Patent Office on Jan. 19, 2001, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A server device for a net game applicable on a network and enabling data communication with mobile communication terminals registered as members, the server device comprising:

organizing means for organizing groups including a specified number of members upon a member registration request from the respective mobile communication terminals, question storage means for storing contents of a plurality of questions, question preparing means for selecting and preparing a specified number of questions from the contents stored in the question storage means, transmitting/receiving means for transmitting the prepared questions to the respective mobile communication terminals in the group and receiving answer information from the respective mobile communication terminals corresponding to the questions presented on monitors of the respective mobile communication terminals, first answer information storage means for storing the answer information in correspondence with the respective mobile communication terminals, congeniality judging means for judging the congeniality of pairs of the respective mobile communication terminals in the group based on the respective pieces of answer information stored in the first answer information storage means and pairing the mobile communication terminals having the answer information showing congeniality, and information exchanging means for permitting exchange of information between the paired mobile communication terminals, including:

access setting means for permitting the paired mobile communication terminals selected to set an access time and an imaginary place in a game space, and an access judging means for judging whether an access has been made at the set access time and place by both players through the paired mobile communication terminals respectively and permitting exchange of information when common access is made.

2. A server device according to claim 1, further comprising:

question drafting means for letting one of the paired mobile communication terminals draft a specified number of questions and expected answers thereto based on the storage contents of the question storage means in order to transmit the questions and possible answers to a partner mobile communication terminal of the paired communication terminals, second answer information, storage means for storing the questions transmitted from the one of the paired mobile communication terminals and answer information identifying answers transmitted from the partner mobile communication terminal in correspondence with the respective mobile communication terminals, and information exchanging means for judging a degree of congeniality based on respective pieces of the answer information scored in the second answer information storage means and said expected answers and permitting an information exchange between the paired mobile communication terminals if the degree of congeniality is high.

3. A server device according to claim 1, wherein the question drafting means enables the paired mobile communication terminals to select the questions and the expected answers from the storage contents of the question storage means and to draft a specified number of questions.

4. A server device according to claim 1, wherein a mailbox is given to each of the paired mobile communication terminals judged to have accessed one another by the access judging means.

5. A server device according to claim 1, further comprising individual data storage means for storing possession information of mailboxes in correspondence with the registered members.

6. A server device according to claim 1, further comprising ranking means for ranking the members in a decreasing order of possessed mailboxes and making the ranking readable in the server device.

7. A server device according to claim 1, wherein the access judging means judges a successful access by a fitting system if actual access times of the paired mobile communication terminals fall within a specified time frame, extending before and after the set access time, with or without overlapping.

8. A server device according to claim 4, further comprising a game progress processing section which prohibits an information exchange concerning electronic mail addresses.

9. A server device according to claim 4, further comprising game progress processing section which includes a list containing characters and words for specifying actual places and prohibits the input of the words contained in said list.

10. A program stored on a computer readable medium for executing a net game on a net game server device applicable on a network and enabling data communication with mobile communication terminals registered as members, said program comprising the steps of:

organizing groups including a specified number of members upon a member registration request from the respective mobile communication terminals, storing contents of a plurality of questions, selecting and preparing a specified number of questions from the stored contents, transmitting the prepared questions to the respective mobile communication terminals in the group and receiving answer information from the respective mobile communication terminals corresponding to the questions presented on monitors of the respective mobile communication terminals, storing the answer information in correspondence with the respective mobile communication terminals, judging the congeniality of pairs of the respective mobile communication terminals in the group based on the stored contents and pairing the mobile communication terminals having the answer information showing congeniality, and permitting information exchange between the paired mobile communication terminals including:

permitting the paired mobile communication terminals selected to set an access time and an imaginary place in a game space, and judging whether an access has been made at the set access time and place by both players through the paired mobile communication terminals respectively and permitting exchange of information when common access is made.

11. A net game progress controlling method by a net game server device applicable on a network and enabling data communication with mobile communication terminals registered as members, comprising the steps of:

organizing groups including a specified number of members upon a member registration request from the respective mobile communication terminals, scoring contents of a plurality of questions, selecting and preparing a specified number of questions from the stored contents, transmitting the prepared questions to the respective mobile communication terminals in the group and receiving answer information from the respective mobile communication terminals corresponding to the questions presented on monitors of the respective mobile communication terminals, storing the answer information in correspondence with the respective mobile communication terminals, judging the congeniality of pairs of the respective mobile communication terminals in the group based on the stored contents and pairing the mobile communication terminals having the answer information showing congeniality, and permitting information exchange between the paired mobile communication terminals including:

permitting the paired mobile communication terminals selected to set an access time and an imaginary place in a game space, and judging whether an access has been made at the set access time and place by both players through the paired mobile communication terminals respectively and permitting exchange of information when common access is made.

12. A computer-readable storing medium storing a net game progress control program implementable on a net game server device applicable on a network and enabling data communication with mobile communication terminals registered as members, said program comprising the steps of:

organizing groups including a specified number of members upon a member registration request from the respective mobile communication terminals, storing contents of a plurality of questions, selecting and preparing a specified number of questions from the stored contents, transmitting the prepared questions to the respective mobile communication terminals in the group and receiving answer information from the respective mobile communication terminals corresponding to the questions presented on monitors of the respective mobile communication terminals, storing the answer information in correspondence with the respective mobile communication terminals, judging the congeniality of pairs of the respective mobile communication terminals in the group based on the stored contents and pairing the mobile communication terminals having the answer information showing congeniality, and permitting information exchange between the paired mobile communication terminals including:

permitting the paired mobile communication terminals selected to set an access time and an imaginary place in a game space, and judging whether an access has been made at the set access time and place by both players through the paired mobile communication terminals respectively and permitting exchange of information when common access is made.

13. A server device for a net game applicable on a network and enabling data communication with mobile communication terminals registered as members, the server device comprising:

organizing means for organizing groups including a specified number of members upon a member registration request from the respective mobile communication terminals, question storage means for storing contents of a plurality of questions, question preparing means for selecting and preparing a specified number of questions from the contents stored in the question storage means, transmitting/receiving means for transmitting the prepared questions to the respective mobile communication terminals in the group and receiving answer information from the respective mobile communication terminals corresponding to the questions presented on monitors of the respective mobile communication terminals, first answer information storage means for storing the answer information in correspondence with the respective mobile communication terminals, congeniality judging means for judging the congeniality of pairs of the respective mobile communication terminals in the group based on the respective pieces of answer information stored in the first answer information storage means and pairing the mobile communication terminals having the answer information showing congeniality, question drafting means for letting one of the paired mobile communication terminals draft a specified number of questions and expected answers thereto based on the storage contents of the question storage means in order to transmit the questions and possible answers to a partner mobile communication terminal of the paired communication terminals, second answer information storage means for storing the questions transmitted from the one of the paired mobile communication terminals and answer information identifying answers transmitted from the partner mobile communication terminal in correspondence with the respective mobile communication terminals, and information exchanging means for judging a degree of congeniality based on the answer information stored in the second answer information storage means and said expected answers and permitting an information exchange between the paired mobile communication terminals if a degree of congeniality is high, the information exchange means including:

access setting means for permitting the paired mobile communication terminals selected to set an access time and an imaginary place in a game space, and an access judging means for judging whether an access has been made at the set access time and place by both players through the paired mobile communication terminals respectively and permitting exchange of information when common access is made, wherein operation of the access setting means and the access judging means is limited to the paired communications terminals judged to have a high degree of congeniality based on the answer information stored in the second answer information storage means.

* * * * *

UNITED STATES PATENT AND TRADEMARK OFFICE
CERTIFICATE OF CORRECTION

PATENT NO.         : 7,113,975 B2                                          Page 1 of 1
APPLICATION NO. : 10/047794
DATED              : September 26, 2006
INVENTOR(S)        : Norio Nakayama et al.

It is certified that error appears in the above-identified patent and that said Letters Patent is hereby corrected as shown below:

On Title Page, Item (75)

Please correct the name of the third inventor as indicated below:

(75)   Inventors:    Hiromoto Yotsugi, Osaka (JP)

to

(75)   Inventors:    Hirotomo Yotsugi, Osaka (JP).

Signed and Sealed this

Third Day of April, 2007

JON W. DUDAS
*Director of the United States Patent and Trademark Office*